United States Patent
Edwards

(10) Patent No.: US 6,896,959 B2
(45) Date of Patent: May 24, 2005

(54) MAGNETIC RECORDING MEDIUM HAVING NARROW PULSE WIDTH CHARACTERISTICS

(75) Inventor: Bruce H. Edwards, White Bear Lake, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/441,419

(22) Filed: May 19, 2003

(65) Prior Publication Data

US 2004/0234817 A1 Nov. 25, 2004

(51) Int. Cl.$^7$ ................................................. G11B 5/706
(52) U.S. Cl. ............................... 428/323; 428/694 BS; 428/694 BA; 428/694 BB
(58) Field of Search ........................... 428/323, 694 BS, 428/694 BA, 694 BB

(56) References Cited

U.S. PATENT DOCUMENTS

| | | |
|---|---|---|
| 5,501,903 A | 3/1996 | Erkkila et al. |
| 5,510,187 A | 4/1996 | Kumar et al. |
| 5,827,600 A | 10/1998 | Ejiri et al. |
| 6,099,895 A | 8/2000 | Mayo et al. |
| 2003/0108772 A1 * | 6/2003 | Noguchi et al. ...... 428/694 BS |

* cited by examiner

*Primary Examiner*—Stevan A. Resan
(74) *Attorney, Agent, or Firm*—Eric D. Levinson

(57) ABSTRACT

A dual-layer magnetic recording medium including a non-magnetic substrate having a front side and a back side, a lower support layer formed over the front side and a magnetic upper recording layer formed over the lower layer, wherein the magnetic layer contains a volume concentration of at least about 35% of a magnetic metallic particulate pigment having a coercivity of at least about 2000 Oersteds (Oe), and a binder system for the pigment. The magnetic recording medium exhibits an orientation ratio greater than 2.0, a pulsewidth (PW50) value of less than about 500 nm, and a remanence-thickness product, Mr*t, of less than about 5.0 memu/cm$^2$.

18 Claims, No Drawings

MAGNETIC RECORDING MEDIUM HAVING NARROW PULSE WIDTH CHARACTERISTICS

THE FIELD OF THE INVENTION

The present invention relates to magnetic recording media such as magnetic tapes, and more specifically to the magnetic layer of the media which contains particulate metallic pigments that have high magnetic coercivity and a high volume concentration. The media exhibit narrower pulse-width characteristics and lowered remanence-thickness product.

BACKGROUND OF THE INVENTION

Magnetic recording media are widely used in audio tapes, video tapes, computer tapes, disks and the like. Magnetic media may use thin metal layers as the recording layers, or may comprise particulate magnetic compounds as the recording layer. The latter type of recording media employs particulate materials such as ferromagnetic iron oxides, chromium oxides, ferromagnetic alloy powders and the like dispersed in binders and coated on a substrate. In general terms, magnetic recording media generally comprise a magnetic layer coated onto at least one side of a non-magnetic substrate (e.g., a film for magnetic recording tape applications).

In certain designs, the magnetic coating (or "front coating") is formed as a single layer directly onto a non-magnetic substrate. In an effort to reduce the thickness of this magnetic recording layer, an alternative approach has been developed to form the front coating as a dual-layer construction, including a support layer (or "lower layer") on the substrate and a reduced-thickness magnetic layer (or "upper layer") formed directly on the support or lower layer. With this construction, the lower layer is typically non-magnetic or substantially non-magnetic, generally comprised of a non-magnetic powder and a binder. Conversely, the upper layer comprises a magnetic metal particle powder or pigment dispersed in a polymeric binder.

In addition, with magnetic recording tapes, a backside coating is typically applied to the opposing side of the non-magnetic substrate in order to improve the durability, conductivity, and tracking characteristics of the media.

It is also known in the art to calender the medium during its manufacture, e.g., to pass the medium through a series of opposed rollers before winding it into a roll, to improve surface smoothness. It is also known to heat-soak magnetic tape in wound form, after the coating and calendering processes, to "cure" the tape's coatings and increase the glass transition temperatures of the binder matrices. After the curing is complete, the tape is converted for use in cartridges. Calendering occurs at a calendering temperature of, for example, between about 90° C. and about 95° C. The calendering includes passing the substrate between opposed, generally non-compliant rolls, and optionally further includes calendering the substrate between additional opposed rolls, at least one of the additional opposed rolls being generally compliant. The calendering includes off-line calendering, and additionally includes in-line calendering, using at least one generally compliant roll, prior to the heat-curing, according to embodiments of the invention.

The single layer coating on magnetic recording media, and both layers of dual-layer magnetic recording media, generally include a granular pigment. Popular pigments are metal oxides, ferrimagnetic or ferromagnetic metal oxides, and ferromagnetic metal alloys; the material in the lower layer of the dual-layer media is generally non-magnetic, and that in the upper layer is magnetic. Different pigments have different surface properties; the metal particles often have a strongly basic surface. Recording media often utilize alpha iron oxide ($\alpha$-$Fe_2O_3$) particles in the formulations; dual-layer recording media may utilize such particles in the nonmagnetic lower layer formulations, along with carbon black particles. The magnetic layer of such recording media often utilize gamma iron oxide ($\gamma$-$Fe_2O_3$), magnetite ($Fe_3O_4$), cobalt-doped iron oxides, or ferromagnetic metal or metal alloy powders, along with carbon black particles.

All front coatings or layers of magnetic recording media generally include a binder composition. The binder composition performs such functions as dispersing the particulate materials, increasing adhesion between layers and to the substrate, imparting cohesion of the particles in the layers, improving gloss and the like. As might be expected, the formulation specifics associated with the requisite upper layer, lower layer, and back coat, as well as coating of the same to an appropriate substrate are highly complex, and vary from manufacturer to manufacturer; however, most binders include such materials as thermoplastic resins. Many factors affect the performance of magnetic media, including the binder system; the lubricants; the method of forming a dispersion from the ingredients; the coating, drying and calendering conditions; the level of cleanliness around the coating head and calendering rolls; the smoothness of the tape; the number, frequency, and heights of protuberances on the magnetic surface. One measure of magnetic media performance is pulsewidth, often abbreviated as PW50. PW50 is a measurement of a signal recorded at such a low density that the transitions are isolated from one another; i.e., they do not interact or interfere with one another. The amplified, unequalized and unfiltered signal from the read head is displayed on an oscilloscope and the width along the time axis of the resulting positive and/or negative pulses halfway from the baseline to their peaks is measured. This time interval is multiplied by the tape transport speed to obtain the pulsewidth, as a distance.

It has now been discovered that using magnetic recording media having multiple layers wherein the upper magnetic layer contains certain metallic pigments in the magnetic layer of a magnetic recording medium, e.g., particle pigments having a coercivity of greater than about 2000 Oersteds (Oe), with particles having lengths of less than about 100 nanometers (nm), preferably less than 80 nm at a volume concentration of greater than about 35%, significantly narrows the PW50 characteristics of the resulting medium.

SUMMARY OF THE INVENTION

One aspect of the invention provides a dual-layer magnetic recording medium including a non-magnetic substrate, a lower support layer, and a magnetic upper layer, and optionally, a back coat. The substrate defines a front side and back side, with the back coat, if desired, being formed on the back side. The magnetic upper layer is disposed over the lower support layer on the front side of the substrate and includes a volume concentration of at least about 35% of a primary magnetic metallic particulate pigment material having a coercivity of at least about 2000 Oe, and an average particle size of less than about 100 nm, and a binder system therefor. The coated medium preferably has an orientation ratio greater than about 2.0, a PW50 of less than about 500 nm, and a remanence-thickness product, Mr*t, of less than about 5.0 memu/$cm^2$, preferably less than about 4.0 memu/$cm^2$.

Another aspect of the invention provides a dual-layer magnetic recording medium comprising a non-magnetic substrate having a front side and a back side, a lower support layer and an upper magnetic recording layer formed on the front side, said upper magnetic layer including a volume concentration of at least about 40% of a primary magnetic metallic particulate pigment material having a coercivity of at least about 2000 Oe, and an average particle size of less than about 100 nm, wherein the coated medium has an orientation ratio greater than about 2.0, a PW50 of less than about 500 nm, and a remanence-thickness product, Mr*t, of less than about 5.0 memu/cm$^2$, preferably less than about 4.0 memu/cm$^2$.

As used herein, all weights, ratios and amounts are by weight unless otherwise specified.

As used herein, the following terms have these meanings:

1. The term "low molecular weight" means having a molecular weight of less than about 500.

2. The terms "coercivity" and "magnetic coercivity" are synonymous, are abbreviated (Hc), and refer to the intensity of the magnetic field needed to reduce the magnetization of a ferromagnetic material to zero after it has reached saturation.

3. The term "Oersted" refers to a unit of magnetic field and is equivalent to (¼π) kA/m.

4. The term "soft" means magnetically soft, i.e., having a coercivity of less than about 300 Oersteds (Oe).

5. The terms "layer" and "coating" are used interchangeably to refer to a coated composition.

6. The terms "PW50" and "pulsewidth" are used interchangeably herein. Pulsewidth is tested by recording a signal on a magnetic recording medium at a sufficiently low density that the transitions are isolated from one another; i.e., they do not interact or interfere with one another. The amplified, unequalized and unfiltered signal from the read head is displayed on an oscilloscope and the width along the time axis of the resulting positive and/or negative pulses halfway from the baseline to their peaks is measured. This time interval is multiplied by the tape transport speed to obtain the pulsewidth, as a distance.

7. The term "remanence-thickness product," is abbreviated Mr*t, and means the product of the remanent magnetization after saturation in a strong magnetic field (10 kOe) multiplied by the thickness of the magnetic coating. This value is measured in memu/cm$^2$.

8. The term "orientation ratio" means the ratio of the remanent magnetization (at zero applied magnetic field) after saturation in a strong magnetic field (10 kOe) measured in the direction parallel to that of the recording medium's intended transport to the corresponding quantity measured in the direction transverse (perpendicular, but in the plane of the medium) to that of the recording medium's intended transport.

DETAILED DESCRIPTION OF THE PREFERRED EMBODIMENTS

The following detailed description describes certain embodiments and is not to be taken in a limiting sense. The scope of the present invention is defined by the appended claims. The magnetic recording medium includes a non-magnetic substrate, a magnetic upper layer, a lower support layer, or sublayer, and, typically, a back coat layer. The various components are described in greater detail below. In general terms, however, the magnetic upper layer includes a primary metallic pigment powder having a coercivity of greater than about 2000 Oe, and a binder system for the pigment. The lower support layer includes a primary powder material consisting of particles that are essentially nonmagnetic (although some magnetic particles having a coercivity of 300 Oe or less may be included) dispersed in a binder system.

In accordance with the current invention, coated magnetic recording media have an orientation ratio of greater than about 2.0, preferably greater than about 2.2. The medium exhibits a narrowed PW50, i.e., the PW50 is less than about 500 nm, preferably less than about 450 nm The Magnetic Recording Layer The upper layer of the medium is a magnetic recording layer. The magnetic recording layer has a thickness of from about 2 microinches (0.05 μm) to about 20 microinches (0.50 μm) in thickness, preferably from about 2 to about 15 microinches. The medium also has a remanence-thickness product, Mr*t, a thickness measurement, of less than about 5.0 memu/cm$^2$, preferably less than 4.0 memu/cm$^2$.

The magnetic metal particle pigment comprises a primary magnetic metal particle pigment having a coercivity of at least about 2000 Oe, preferably at least about 2300 Oe. Such pigment preferably has an average particle length of less than about 100 nm, preferably less than about 80 nm. The pigment is present in the upper magnetic layer in a volume concentration of at least about 35%, preferably about 40%.

The magnetic metal particle pigments have a composition including, but not limited to, metallic iron and/or alloys of iron with cobalt and/or nickel, and magnetic or non-magnetic oxides of iron, other elements, or mixtures thereof. Alternatively, the magnetic particles can be composed of hexagonal ferrites such as barium ferrites. In order to improve the required characteristics, the preferred magnetic powder may contain various additives, such as semi-metal or non-metal elements and their salts or oxides such as Al, Co, Y, Ca, Mg, Mn, Na, etc. The selected magnetic powder may be treated with various auxiliary agents before it is dispersed in the binder system, resulting in the primary magnetic metal particle pigment. Preferred pigments have an average particle length no greater than about 100 nanometers (nm), preferably no more than about 80 nm. Such pigments are readily commercially available from companies such as Toda Kogyo, KDK, and Dowa Mining Company.

The use of the higher coercivity pigment at a higher volume along with the binders and other ingredients discussed below in the magnetic layer yields a magnetic recording medium exhibiting significantly narrowed pulsewidth, when measured by recording a signal on a magnetic recording medium at a sufficiently low density that the transitions are isolated from one another; i.e., they do not interact or interfere with one another. The amplified, unequalized and unfiltered signal from the read head is displayed on an oscilloscope and the width along the time axis of the resulting positive and/or negative pulses halfway from the baseline to their peaks is measured. This time interval is multiplied by the tape transport speed to obtain the pulsewidth, as a distance. The PW50 for the magnetic recording medium of the invention is less than about 500 nm, preferably less than about 450 nm.

In addition to the preferred primary magnetic metal particle pigment described above, the metal particle pigment of the upper layer further includes carbon particles. A small amount, preferably less than 2%, of at least one large particle carbon material is also included, preferably a material that includes spherical carbon particles. The large particle carbon materials have a particle size on the order of from about 50 to about 500 nm, more preferably from about 100 to about 300 nm. Spherical large carbon particle materials are known and commercially available, and in commercial form can include various additives such as sulfur to improve performance. The remainder of the carbon particles present in the upper layer are small carbon particles, i.e., the particles have a particle length on the order of less than 100 nm, preferably less than about 75 nm.

The magnetic upper layer also includes an abrasive or head cleaning agent (HCA) component. One preferred HCA component is aluminum oxide. Other abrasive grains such as silica, $ZrO_2$, $Cr_2O_3$, etc., can also be employed, either alone or in mixtures with aluminum oxide or each other.

The binder system associated with the upper layer preferably incorporates at least one binder resin, such as a thermoplastic resin, in conjunction with other resin components such as binders and surfactants used to disperse the HCA, a surfactant (or wetting agent), and one or more hardeners. In one preferred embodiment, the binder system of the upper layer includes a combination of a primary polyurethane resin and a vinyl resin. Examples of polyurethanes include polyester-polyurethane, polyether-polyurethane, polycarbonate-polyurethane, polyester-polycarbonate-polyurethane, and polycaprolactone-polyurethane. The vinyl resin is frequently a vinyl chloride resin, a vinyl chloride-vinyl acetate copolymer, vinyl chloride-vinyl acetate-vinyl alcohol copolymer, vinyl chloride-vinyl acetate-maleic anhydride and the like. Resins such as bis-phenyl-A-epoxy, styrene-acrylonitrile, and nitrocellulose may also be acceptable in certain magnetic recording medium formulations.

In an alternate embodiment, the vinyl resin is a nonhalogenated vinyl copolymer. Useful vinyl copolymers include copolymers of monomers comprising (meth)acrylonitrile; a nonhalogenated, hydroxyl functional vinyl monomer; a nonhalogenated vinyl monomer bearing a dispersing group, and one or more nonhalogenated nondispersing vinyl monomers. A preferred nonhalogenated vinyl copolymer is a copolymer of monomers comprising 5 to 40 parts of (meth)acrylonitrile, 30 to 80 parts of one or more nonhalogenated, nondispersing, vinyl monomers, 5 to 30 parts by weight of a nonhalogenated hydroxyl functional, vinyl monomer, and 0.25 to 10 parts of a nonhalogenated, vinyl monomer bearing a dispersing group.

In one preferred embodiment, the primary polyurethane binder is incorporated into the upper layer in an amount of about 4 to about 10 parts by weight, and preferably about 6 to about 8 parts by weight, based on 100 parts by weight of the magnetic upper layer pigment, and the vinyl or vinyl chloride binder is incorporated in an amount of from about 7 to about 15 parts by weight, and preferably from about 10 to about 12 parts by weight, based on 100 parts by weight of the magnetic upper layer pigment.

The binder system further preferably includes an HCA binder used to disperse the selected HCA material, such as a polyurethane binder (in conjunction with a pre-dispersed or paste HCA). Alternatively, other HCA binders compatible with the selected HCA format (e.g., powder HCA) are acceptable.

The magnetic upper layer may further contain one or more lubricants such as a fatty acid and/or a fatty acid ester. The incorporated lubricant(s) exist throughout the front-side coating and, importantly, at the surface of the upper layer. The lubricant(s) reduces friction to maintain smooth contact with low drag, and protects the media surface from wear. Thus, the lubricant(s) provided in both the upper and lower layers are preferably selected and formulated in combination.

Preferred fatty acid lubricants include stearic acid that is at least 90 percent pure. Although technical grade acids and/or acid esters can also be employed for the lubricant component, incorporation of high purity lubricant materials ensures robust performance of the resultant medium. Other acceptable fatty acids include myristic acid, palmitic acid, oleic acid, etc., and their mixtures. The upper layer formulation can further include a fatty acid ester such as butyl stearate, isopropyl stearate, butyl oleate, butyl palmitate, butylmyristate, hexadecyl stearate, and oleyl oleate. The fatty acids and fatty acid esters may be employed singly or in combination.

In a preferred embodiment, the lubricant is incorporated into the upper layer in an amount of from about 1 to about 10 parts by weight, and preferably from about 1 to about 5 parts by weight, based on 100 parts by weight of the magnetic upper layer pigment.

The binder system may also contain a conventional surfactant or wetting agent. Known surfactants, such as phenylphosphonic acid (PPA), 4-nitrobenzoic acid, and various other adducts of sulfuric, sulfonic, phosphoric, phosphonic, and carboxylic acids are acceptable.

The binder system may also contain a hardening agent such as isocyanate or polyisocyante. In a preferred embodiment, the hardener component is incorporated into the upper layer in an amount of from about 2 to about 5 parts by weight, and preferably from about 3 to about 4 parts by weight, based on 100 parts by weight of the primary lower layer pigment.

The materials for the upper layer are mixed with the primary pigment and coated atop the lower layer. Useful solvents associated with the lower layer coating material preferably include cyclohexanone (CHO), with a preferred concentration of from about 5% to about 50%, methyl ethyl ketone (MEK) preferably having a concentration of from about 30% to about 90%, and toluene (Tol) of concentrations from about 0% to about 40%. Alternatively, other ratios can be employed, or even other solvents or solvent combinations including, for example, xylene, tetrahydrofuran, methyl isobutyl ketone, and methyl amyl ketone, are acceptable.

The Lower Layer

The lower layer of a dual-layer magnetic tape is essentially non-magnetic and typically includes a non-magnetic or soft magnetic powder having a coercivity of less than about 300 Oe and a resin binder system. By forming the lower layer to be essentially non-magnetic, the electromagnetic characteristics of the upper magnetic layer are not adversely affected. However, to the extent that it does not create any adverse affect, the lower layer may contain a small amount of a magnetic powder.

The pigment or powder incorporated in the lower layer includes at least a primary pigment material and conductive carbon black. The primary pigment material consists of a particulate material, or "particle" selected from non-magnetic particles such as iron oxides, titanium dioxide, titanium monoxide, alumina, tin oxide, titanium carbide, silicon carbide, silicon dioxide, silicon nitride, boron nitride, etc., and soft magnetic particles having a coercivity of less than 300 Oe. Optionally these primary pigment materials can be provided in a form coated with carbon, tin, or other electroconductive material and employed as lower layer pigments. In a preferred embodiment, the primary lower layer pigment material is a carbon-coated hematite material ($\alpha$-iron oxide), which can be acidic or basic in nature. Preferred alpha-iron oxides are substantially uniform in particle size, or a metal-use starting material that is dehydrated by heating, and annealed to reduce the number of pores. After annealing, the pigment is ready for surface treatment, which is typically performed prior to mixing with other layer materials such as carbon black and the like. Alpha-iron oxides are well known and are commercially available from Dowa Mining Company, Toda Kogyo, KDK, Sakai Chemical Industry Co, and others. The primary pigment preferably has an average particle size of less than about 0.25 µm, more preferably less than about 0.15 µm.

Conductive carbon black material provides a certain level of conductivity so as to prohibit the front coating from charging with static electricity and further improves smoothness of the surface of the upper magnetic layer formed thereon. The conductive carbon black material is preferably of a conventional type and is widely commercially available. In one preferred embodiment, the conductive carbon black material has an average particle size of less than about 20 nm, more preferably about 15 nm. In the case where the primary pigment material is provided in a form coated with carbon, tin or other electroconductive material, the conductive carbon black is added in amounts of from about 1 to about 5 parts by weight, more preferably from about 1.5 to about 3.5 parts by weight, based on 100 parts by weight of the primary lower layer pigment material. In the case where the primary pigment material is provided without a coating of electroconductive material, the conductive carbon black is added in amounts of from about 5 to about 18 parts by weight, more preferably from about 8 to about 12 parts by weight, based on 100 parts by weight of the primary lower layer pigment material. The total amount of conductive carbon black and electroconductive coating material in the lower layer is preferably sufficient to provide a resistivity at or below about $1 \times 10^{10}$ ohm/cm$^2$.

The lower layer can also include additional pigment components such as an abrasive or head cleaning agent (HCA). One preferred HCA component is aluminum oxide. Other abrasive grains such as silica, $ZrO_2$, $Cr_2O_3$, etc., can be employed.

The binder system or resin associated with the lower layer preferably incorporates at least one binder resin, such as a thermoplastic resin, in conjunction with other resin components such as binders and surfactants used to disperse the HCA, a surfactant (or wetting agent), and one or more hardeners. In one preferred embodiment, the binder system of the lower layer includes a combination of a primary polyurethane resin and a vinyl chloride resin, a vinyl chloride-vinyl acetate copolymer, vinyl chloride-vinyl acetate-vinyl alcohol copolymer, vinyl chloride-vinyl acetate-maleic anhydride, or the like. In an alternate embodiment, the vinyl resin is a nonhalogenated vinyl copolymer. Useful vinyl copolymers include copolymers of monomers comprising (meth)acrylonitrile; a nonhalogenated, hydroxyl functional vinyl monomer; a nonhalogenated vinyl monomer bearing a dispersing group, and one or more nonhalogenated nondispersing vinyl monomers. A preferred nonhalogenated vinyl copolymer is a copolymer of monomers comprising 5 to 40 parts of (meth) acrylonitrile, 30 to 80 parts of one or more nonhalogenated, nondispersing, vinyl monomers, 5 to 30 parts by weight of a nonhalogenated hydroxyl functional, vinyl monomer, and 0.25 to 10 parts of a nonhalogenated, vinyl monomer bearing a dispersing group.

Examples of useful polyurethanes include polyester-polyurethane, polyether-polyurethane, polycarbonate-polyurethane, polyester-polycarbonate-polyurethane, and polycaprolactone-polyurethane. Resins such as bisphenol-A epoxide, styrene-acrylonitrile, and nitrocellulose may also be acceptable.

In a preferred embodiment, a primary polyurethane binder is incorporated into the lower layer in amounts of from about 4 to about 10 parts by weight, and preferably from about 6 to about 8 parts by weight, based on 100 parts by weight of the primary lower layer pigment. In a preferred embodiment, the vinyl binder or vinyl chloride binder is incorporated into the lower layer in amounts of from about 7 to about 15 parts by weight, and preferably from about 10 to about 12 parts by weight, based on 100 parts by weight of the primary lower layer pigment.

The binder system further preferably includes an HCA binder used to disperse the selected HCA material, such as a polyurethane binder (in conjunction with a pre-dispersed or paste HCA). Alternatively, other HCA binders compatible with the selected HCA format (e.g., powder HCA) are acceptable.

The binder system may also contain a conventional surface treatment agent. Known surface treatment agents, such as phenylphosphonic acid (PPA), 4-nitrobenzoic acid, and various other adducts of sulfuric, sulfonic, phosphoric, phosphonic, and carboxylic acids are acceptable.

The binder system may also contain a hardening agent such as isocyanate or polyisocyanate. In a preferred embodiment, the hardener component is incorporated into the lower layer in amounts of from about 2 to about 5 parts by weight, and preferably from about 3 to about 4 parts by weight, based on 100 parts by weight of the primary lower layer pigment.

The lower layer may further contain one or more lubricants such as a fatty acid and/or a fatty acid ester. The incorporated lubricant(s) exist throughout the front-side coating and, importantly, at the surface of the upper layer. The lubricant(s) reduces friction to maintain smooth contact with low drag, and protects the media surface from wear. Thus, the lubricant(s) provided in both the upper and lower layers are preferably selected and formulated in combination. By way of background, conventional magnetic recording tape formulations employ technical grade fatty acids and fatty acid esters as the lubricant(s). It has surprisingly been found that these technical grade lubricant materials contribute to formation of sticky debris in the front coating due to migration of impurities to the front coating surface. This debris, in turn, can lead to poor tape performance, due to contamination of recording heads and other media transport surfaces, interference with lubricity of the medium in transport causing excessive frictional drag, and media wear.

In a preferred embodiment, the lower layer includes stearic acid that is at least 90 percent pure as the fatty acid. Although technical grade acids and/or acid esters can also be employed for the lubricant component, incorporation of high purity lubricant materials ensures robust performance of the resultant medium. Alternatively, other acceptable fatty acids include myristic acid, palmitic acid, oleic acid, etc., and their mixtures. The lower layer formulation can further include a fatty acid ester such as butyl stearate, isopropyl stearate, butyl oleate, butyl palmitate, butylmyristate, hexadecyl stearate, and oleyl oleate. The fatty acids and fatty acid esters may be employed singly or in combination. In a preferred embodiment, the lubricant is incorporated into the lower layer in an amount of from about 1 to about 10 parts by weight, and preferably from about 1 to about 5 parts by weight, based on 100 parts by weight of the electroconductive-coated primary lower layer pigment.

The materials for the lower layer are mixed with the surface treated primary pigment and the lower layer is coated to the substrate. Useful solvents associated with the lower layer coating material preferably include cyclohexanone (CHO), with a preferred concentration of from about 5% to about 50%, methyl ethyl ketone (MEK) preferably having a concentration of from about 30% to about 90%, and toluene (Tol), of concentrations from about 0% to about 40%. Alternatively, other ratios can be employed, or even other solvents or solvent combinations including, for example, xylene, tetrahydrofuran, methyl isobutyl ketone, and methyl amyl ketone, are acceptable.

Back Coat

The back coat is generally of a type conventionally employed, and thus primarily consists of a soft (i.e., Moh's hardness <5) non-magnetic particle material such as carbon black or silicon dioxide particles. In one embodiment, the back coat layer comprises a combination of two kinds of carbon blacks, including a primary, small carbon black component and a secondary, large texture carbon black component, in combination with appropriate binder resins. The primary, small carbon black component preferably has an average particle size on the order of from about 10 to about 25 nm, whereas the secondary, large carbon component preferably has an average particle size on the order of from about 50 to about 300 nm.

As is known in the art, back coat pigments dispersed as inks with appropriate binders, surfactant, ancillary particles, and solvents are typically purchased from a designated supplier. In a preferred embodiment, the back coat binder includes at least one of: a polyurethane polymer, a phenoxy resin, or nitrocellulose added in an amount appropriate to modify coating stiffness as desired.

Substrate

The substrate can be any conventional non-magnetic substrate useful as a magnetic recording medium support. Exemplary substrate materials useful for magnetic recording tapes include polyesters such as polyethylene terephthalate (PET), polyethylene naphthalate (PEN), a mixture of polyethylene terephthalate and polyethylene naphthalate; polyolefins (e.g., polypropylene); cellulose derivatives; polyamides; and polyimides. Preferably, polyethylene terephthalate or polyethylene naphthalate is employed.

Although specific embodiments have been described herein for purposes of description of the preferred embodiment, it will be appreciated by those of ordinary skill in the art that a wide variety of alternate and/or equivalent implementations calculated to achieve the same purposes may be substituted for the specific embodiments described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

EXAMPLES

The following table lists the physical attributes along with the PW50 results measured at 1.77 m/s. The read head had a construction similar to that of a commercially available Ultrium® LTO 1 head with a read gap shield to shield distance of 0.33 micron.

Comparative Example C1

Example C1 in Table 1 is a commercially available Ultrium LTO 1 dual-layer tape.

Examples 4, 7 and 8

Examples 4, 7 and 8 in Table 1 are dual-layer tapes comprising a magnetic upper layer and non-magnetic lower layer coated on a 6.0 $\mu$m PET substrate (Ex. 4), a 4.5 $\mu$m PEN substrate (Ex. 7), and a 6.0 $\mu$m PEN substrate (Ex 8), respectively. In addition, each of the tapes has a back coat on the opposite side of the substrate to the magnetic layer. Both the magnetic layer and non-magnetic sublayer use a binder system comprising a PVC-vinyl copolymer (MR 104) and a commercially available polyurethane (UR-4122) polymer. In addition to the binders, the formulation contains a mixture of fatty acid (stearic acid) and fatty acid esters (butyl stearate and palmitate) as lubricants, alumina as a head cleaning agent, and carbon particles. The magnetic particles used in these examples are acicular metal particles with a long axis length and coercivity as indicated in Table 1. Magnetic orientation was carried out in a conventional manner by passing the coated tape through two pairs of complimentary opposing field permanent magnets while the magnetic and sublayer coatings were in the process of drying.

After drying, the tape was in-line steel-on-compliant calendered followed by off-line steel-on-steel calendering.

Examples 1 and 5

The tapes used in examples 1 and 5 shown in Table 1 were prepared from dispersions and coated similar to those used in Examples 4, 7 and 8. The orientation was carried out using a series of inductive coil magnets such that the magnetic and sublayer coatings were dried to a non-mobile state while in the coil's magnetic field. The tapes were in-line steel-on-steel calendered; no off-line calendering was done. The tapes were prepared with 6.0 $\mu$m PET substrate and the magnetic particle used was the same as that used in Examples 4, 7, and 8.

Examples 2, 3 and 6

The tapes used in examples 2, 3 and 6 were prepared as described in Examples 4, 7 and 8 except that after drying, the tapes were in-line steel-on-compliant calendered followed by off-line steel-on-compliant calendering.

TABLE 1

| Example | MP Length (nm) | Coercivity (Oe) | Orientation Ratio | Mr*t (memu/cm$^2$) | PW50 (nm) |
|---|---|---|---|---|---|
| 1 | 75 | 2640 | 2.3 | 1.14 | 343 |
| 2 | 75 | 2500 | 2.1 | 1.59 | 361 |
| 3 | 75 | 2500 | 2.1 | 2.12 | 366 |
| 4 | 75 | 2336 | 2.3 | 2.84 | 384 |
| 5 | 75 | 2548 | 2.1 | 4.42 | 464 |
| 6 | 75 | 2500 | 2.1 | 3.26 | 425 |
| 7 | 75 | 2539 | 2.2 | 4.73 | 484 |
| 8 | 75 | 2532 | 2.2 | 3.02 | 452 |
| C1 | 110 | 1880 | 2.3 | 4.28 | 544 |

What is claimed is:

1. A dual-layer magnetic recording medium comprising a non-magnetic substrate having a front side and a back side, a lower support layer formed over the front side and a magnetic upper recording layer formed over said lower layer, comprising a volume concentration of at least about 35% of a primary magnetic metallic particulate pigment having a coercivity of at least about 2000 Oe, said magnetic pigment particles having an average particle length of no more than about 100 nm, and a binder for the pigment, wherein said medium has a remanence-thickness product, Mr*t, of less than about 5.0 memu/cm$^2$, an orientation ratio greater than about 2.0, and a PW50 of less than about 500 nm.

2. A dual-layer magnetic recording medium according to claim 1 wherein said magnetic recording medium has a remanence-thickness product of less than 4.0 memu/cm$^2$.

3. A dual-layer magnetic recording medium according to claim 1 wherein said upper magnetic layer comprises said magnetic metallic particulate pigment in a volume concentration of at least about 40%.

4. A dual-layer magnetic recording medium according to claim 1, having an orientation ratio greater than about 2.2.

5. A dual-layer magnetic recording medium according to claim 1 wherein the magnetic recording medium has a PW50 of less than about 450 nm.

6. A dual-layer magnetic recording medium according to claim 1 wherein said magnetic pigment has a coercivity of at least about 2300 Oe, and the magnetic pigment particles have an average length no greater than about 80 nm.

7. A dual-layer magnetic recording medium according to claim 1 wherein said binder system comprises a hard resin component and a soft resin component.

8. A dual-layer magnetic recording medium according to claim 7 wherein said soft resin component is a polyurethane resin.

9. A dual-layer magnetic recording medium according to claim 7 wherein said hard resin component is a vinyl chloride resin.

10. A dual-layer magnetic recording medium according to claim 7 wherein said hard resin component is a nonhalogenated vinyl resin.

11. A dual-layer magnetic recording medium according to claim 1 wherein said magnetic recording layer further comprises a large carbon particle material having a particle size of from about 50 to about 500 nm.

12. A dual layer magnetic recording medium according to claim 1 wherein the upper layer comprises a primary ferromagnetic pigment, aluminum oxide, a spherical large particle carbon material having a particle size of from about 50 to about 500 nm, a polyurethane binder, a vinyl chloride binder, a hardener, a fatty acid ester lubricant, and a fatty acid lubricant.

13. A dual-layer magnetic recording medium according to claim 1 wherein said lower layer comprises:

a pigment powder that is essentially nonmagnetic or a soft magnetic powder having a coercivity of less than about 300 Oe, and a resin binder system therefor.

14. A dual-layer magnetic recording medium according to claim 13 wherein said lower layer further includes a fatty acid ester lubricant, a fatty acid lubricant dispersed in said binder.

15. A dual-layer magnetic recording medium according to claim 13 wherein said conductive carbon black comprises less than about 5 weight percent of said lower layer.

16. A dual-layer magnetic recording medium according to claim 1 further comprising a back coat coated on said back side of said substrate.

17. A dual-layer magnetic recording medium according to claim 16, wherein the back coat includes a carbon black pigment, a urethane binder, and at least one compound selected from phenoxy resin and nitrocellulose.

18. A magnetic recording medium according to claim 16 wherein the back coat further comprises carbon black, and a metal oxide selected from titanium dioxide, aluminum oxide, and a mixture thereof.

* * * * *